United States Patent [19]

Chatzipetros et al.

[11] 4,343,413
[45] Aug. 10, 1982

[54] DOUBLE-WALL VESSEL ESPECIALLY DEWAR FLASKS, WITH WALL SPACER

[75] Inventors: Johann Chatzipetros, Frechen; Manfred Helten, Titz-Müntz, both of Fed. Rep. of Germany

[73] Assignee: Kernforschungsanlage Jülich GmbH, Jülich, Fed. Rep. of Germany

[21] Appl. No.: 198,043

[22] Filed: Oct. 17, 1980

[30] Foreign Application Priority Data

Oct. 18, 1979 [DE] Fed. Rep. of Germany ....... 2942164

[51] Int. Cl.³ .............................................. B65D 90/06
[52] U.S. Cl. .................... 220/425; 220/445; 220/420
[58] Field of Search ............................. 220/420–425, 220/437–439, 445–447, 901; 248/149; 215/13 R

[56] References Cited

U.S. PATENT DOCUMENTS

| 797,577 | 8/1905 | Heylandt | 220/420 |
|---|---|---|---|
| 1,262,009 | 4/1918 | Brady | 220/445 |
| 1,828,435 | 10/1931 | Otte | 220/445 X |
| 2,596,224 | 5/1952 | Jacket | 220/425 |
| 2,722,336 | 11/1955 | Wexler et al. | 220/446 X |
| 2,845,199 | 7/1958 | Putman et al. | 220/901 |
| 3,043,466 | 7/1962 | Gardner | 220/901 |
| 3,094,071 | 6/1963 | Beckman | 220/901 |
| 3,355,051 | 11/1967 | Kloeckner | 220/15 |
| 3,357,589 | 12/1967 | Spaulding et al. | 220/15 |
| 3,401,816 | 9/1968 | Witt | 220/445 X |
| 3,487,971 | 1/1970 | Kirgis et al. | 220/423 |
| 4,066,184 | 1/1978 | Cuthbert et al. | 220/901 |

FOREIGN PATENT DOCUMENTS

| 584160 | 9/1959 | Canada | 220/901 |
|---|---|---|---|
| 625641 | 8/1961 | Canada | 220/901 |
| 1186088 | 1/1965 | Fed. Rep. of Germany . | |
| 194120 | 3/1967 | U.S.S.R. | 220/420 |

*Primary Examiner*—William Price
*Assistant Examiner*—Gary E. Elkins
*Attorney, Agent, or Firm*—Karl F. Ross

[57] ABSTRACT

A double-wall vessel has its inner walls spaced from the outer wall by a plurality of insulating spacers, each of which includes a thread stud affixed to one of the walls and reaching toward the other, the length of the stud being greater than the spacing tolerance of the vessel. On each thread stud is screwed a support body of thermally insulating material and arranged such that, wherein the body is screwed fully onto its stud, its maximum distance from the wall on which the stud is mounted is not greater than the minimum spacing between the two walls.

6 Claims, 3 Drawing Figures

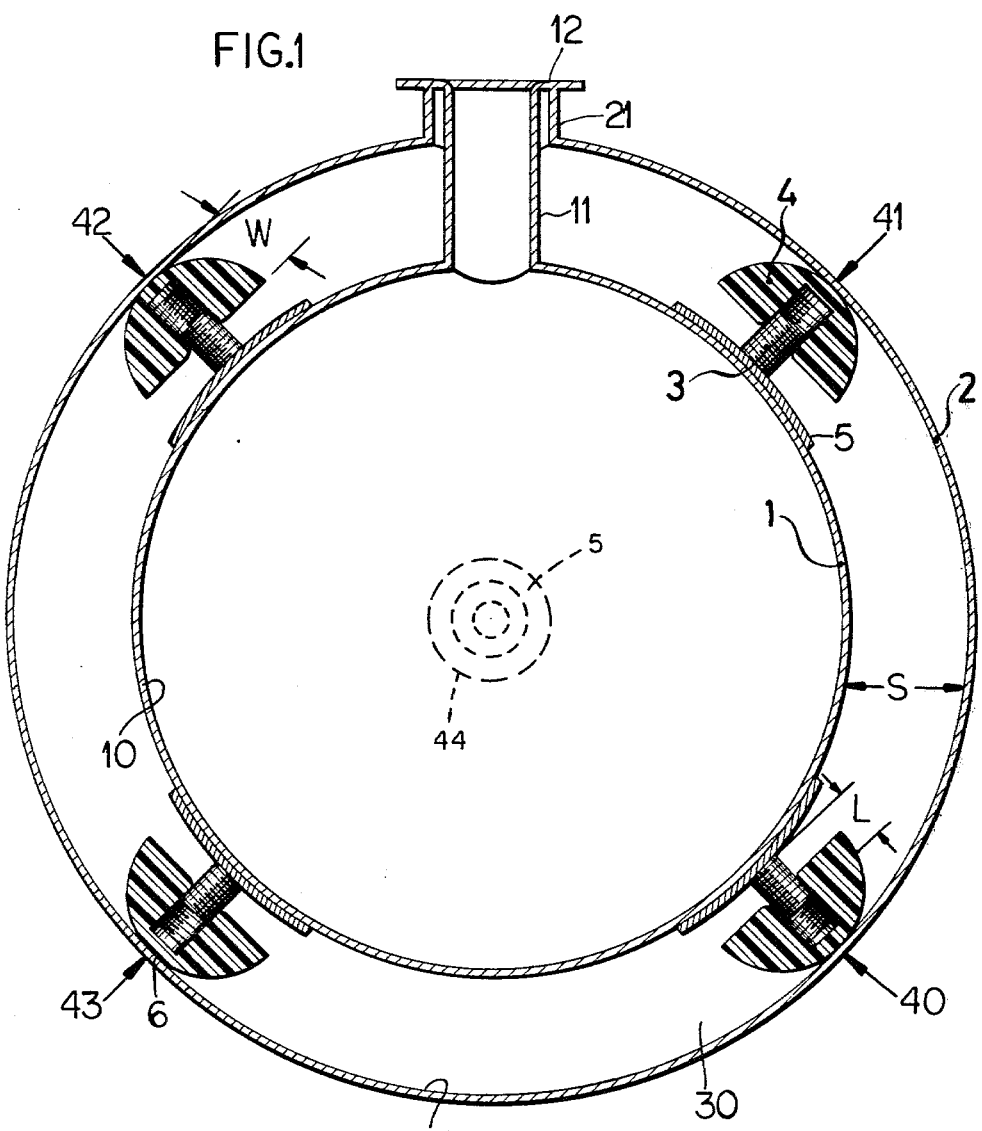

DOUBLE-WALL VESSEL ESPECIALLY DEWAR FLASKS, WITH WALL SPACER

FIELD OF THE INVENTION

The present invention relates to wall spacers for double-wall vessels and to devices for suporting an inner vessel on the wall of an outer vessel, especially for double-wall vessels used in low-temperature applications, e.g. for cryogenic purposes, such as Dewar flasks.

BACKGROUND OF THE INVENTION

Double-wall vessels are employed widely in low-temperature or cryogenic fields as containers for low-temperature fluids and generally comprise an inner vessel or wall and an outer vessel spaced from the inner vessel and surrounding same so that incursion of heat to the inner vessel is minimum. Such structures, therefore, have an inner wall member and an outer wall member which must be maintained in a spaced relationship to one another to prevent direct or conducted heat transfer between.

In the case of Dewar flasks, for example, the inner vessels or wall and the other wall may be silvered to minimize radiation transfer heat therebetween while the space between the wall members is constructed so as to minimize convective heat transfer.

In general, the walls are relatively thin and hence support must be provided for the inner wall member upon the outer wall member.

Dewar flasks of the aforedescribed type are used generally for the storage or production of low boiling liquids, especially so-called liquefied gases, including liquid nitrogen or liquid helium.

In practice it has been found to be difficult to assemble such double-wall vessels because the setting of the space between the walls is ticklish and failure to provide effective spacing or proper support may result in tearing of one of the wall members at the mouth or neck of the flask. Furthermore, the problem is complicated by the fact that most effective thermal isolation is obtained with very thin walls and by the fact that the means spacing the walls from one another should not be thermally conductive.

In German patent document (Printed application - Auslegeschrift) DE-AS No. 1,186,088 the spacing is achieved with thin spacer bars of high strength material received in sleeves. Adjustment with these spacers is not simple and, since the bars are usually composed of metal, the thermal transport through the spacers is considerable.

OBJECTS OF THE INVENTION

It is the principal object of the present invention to provide an improved spacer for double-wall vessels which obviates the disadvantages of the earlier systems and minimizes heat transfer while facilitating adjustment of the inner wall spacing and providing effective support of one wall on the other.

Another object of our invention is to provide a double-wall vessel having improved spacers of the latter type.

SUMMARY OF THE INVENTION

WE have found that it is possible to provide a wall spacer for support for double-wall vessels which is robust, strong, simple to use and especially effective without permitting heat transfer from one wall to the other, if the spacer, according to the invention, comprises a threaded pin, rod or bolt affixed to one of the walls and extending toward the other and a body of thermally low conducting material threaded onto this bolt and bearing upon this other wall. Preferably said body is a rigid body.

According to the invention the length of the bolt exceeds the maximum manufacturing tolerance of the wall spacing while, when this body is fully threaded onto its bolt, its maximum distance from the said one wall (the wall to which the bolt is affixed) is not greater than the minimum possible wall spacing.

The bearing body can have any convenient form although we have found that conical or frustoconical shapes are advantageous and solid or shell hemispherical shapes are preferred. The body can, for example, have the configuration of a half shell provided with a threaded sleeve.

Advantageously the body is composed of material of low or zero thermal conductivity, i.e. an insulating body. A preferred material for the body is polytetrafluoroethylene (Teflon). Advantageously the number of spacers is not greater than that required for effective support and adjustment of this spacing. When the inner and outer wall members are generally spherical, for a round bottom or spherical Dewar flask, at least six symmetrically disposed support bodies are preferably used.

With the support bodies of the present invention, fabrication tolerances can be compensated with the insulating body screwed out or in to a greater or lesser extent to bridge the gap between the two walls in spite of these tolerances.

BRIEF DESCRIPTION OF THE DRAWING

The above and other objects, features and advantages of the present invention will become more readily apparent from the following description, reference being made to the accompanying drawing.

FIG. 1 is an axial section through a Dewar flask utilizing the spacers of the present invention;

FIG. 2 is a perspective view of the flask drawn to a much smaller scale; and

FIG. 3 is a cross sectional view through a shell-shaped bearing body according to the present invention.

SPECIFIC DESCRIPTION

The drawing shows a Dewar flask for a low boiling liquid, i.e. so-called liquefied gases such as helium, which comprises a spherical inner vessel 10 formed by a spherical inner wall 1 and a spherical outer vessel 20 formed by a spherical outer wall 2.

The inner wall 1 is extended in a neck 11 terminating in a flange 12 sealing the inner space 30 between the walls, this space being evacuated.

The outer vessel 20 has a neck 21 coaxial with the neck 11 and sealed thereto at the flange 12.

The spacing between the two walls is represented at S. It can be assumed for the sake of this description that the dimensional tolerance of the spacing S is T as given in percent.

The inner vessel 10 is separated on and spaced from the outer vessel by six spacer assemblers, 40, 41, 42, 43, 44 and 45 (the latter being indicated in FIG. 2). These elements are equally spaced from one another and lie on vertices of a cube so that four of them lie in each plane such as the plane of the paper in FIG. 1.

Spacer 44 is hidden behind the vessel 10 in FIG. 1 and a corresponding spacer 45 is provided at the diametrically opposite side of the flask and is therefore not visible in FIG. 1 but can only be seen in FIG. 2.

Each of these spacers comprises a base 5 which is welded to the inner wall 1 and is affixed to a threaded pin or bolt 3 which can be a V2A bolt with a length of 10 mm. On each bolt 3 a solid polytetrafluoroethylene hemisphere 4, provided with an internal thread, is screwed.

The length of each bolt L should be at least equal to the dimensional tolerance of the spacing $T \times S$ and if, for example, T is 30%, the length L must be greater than 0.3 S. When the bodies 4 are fully screwed onto the bolts 3, their bearing tips 6 should have a radial spacing from the wall 1 which is not greater than the minimun spacing S. In other words, the radial width W of the unit of the bolt 3 with the body 4 fully threaded thereon should not be greater than the minimum dimension S.

Of course, instead of solid bodies 4 the latter can be instituted as half shells provided with internally threaded sleeves which engage the bolts. The shell 60 of Teflon has an internally threaded sleeve 61 which can be screwed onto bolt 3 FIG. 3.

The spacers described support the inner vessel uniformly on the outer vessel and completely mimimize stress on the necks of the flask. With such spacers the walls can be thoroughly thin. Mounting and adjustment is simple even for large vessels—having an inner vessel and an outer vessel welded together along the seam 50 for example (see FIG. 2)—since even before the bonding of these sections, a highly stable structure is provided.

When manufacturing the inventive double walled vessel starting from the perfect inner wall while the outer wall is divided in (perhaps two) sections, the wall spacers fixed to one or the other wall are adjusted to the desired wall spacing. Then the inner wall is arranged in or onto the lower part or section of the outer wall and the upper part of the outer wall is provisionally brought into its position for welding. The welding only is carried out when the lower and upper sections of the outer wall just fit together, the upper section touching the exactly adjusted wall spacers.

We claim:
1. A double-wall vessel comprising:
an inner receptacle;
an outer receptacle spacedly surrounding said inner receptacle and sealed thereto, said inner receptacle defining an inner wall and said outer receptacle defining an outer wall juxtaposed with said inner wall but spaced therefrom by an interwall spacing; and
spacer means interposed between said walls, said spacer means including a plurality of spacer assemblies regularly spaced from each other, each of said assemblies comprising:
a threaded pin fixed to one of said walls and reaching toward the other of said walls, said pin having a length smaller than said interwall spacing but greater than a maximum fabrication tolerance of said interwall spacing, and
a thermally insulating body threaded onto said pin and engaging with a top of said body slidably said other of said walls, said top of said body having a maximum distance from said one of said walls when fully threaded onto said pin which is not greater than the minimum interwall spacing.

2. A double-wall vessel comprising:
an inner receptacle;
an outer receptacle spacedly surrounding said inner receptacle and sealed thereto, said inner receptacle defining an inner wall and said outer receptacle defining an outer wall juxtaposed with said inner wall but spaced therefrom by an interwall spacing; and
spacer means interposed between said walls, said spacer means including a plurality of spacer assemblies regularly spaced from each other, each of said assemblies comprising:
a threaded pin fixed to one of said walls and reaching toward the other of said walls, said pin having a length smaller than said interwall spacing but greater than a maximum fabrication tolerance of said interwall spacing, and
a thermally insulating body of hemispherical shape threaded onto said pin and engaging with a top of said body slidably said other of said walls, said top of said body having a maximum distance from said one of said walls when fully threaded onto said pin which is not greater than the minimum interwall spacing.

3. The vessel defined in claim 2 wherein said body is an internally threaded solid body.

4. The vessel defined in claim 2 wherein said body is formed as a shell.

5. The vessel defined in claim 1, claim 2, claim 3 or claim 10 wherein said body is composed of polytetrafluorethylene.

6. The vessel defined in claim 1, claim 2, claim 3 or claim 10 wherein the space between said walls is evacuated and said vessel is a Dewar flask.

* * * * *